Patented June 16, 1942

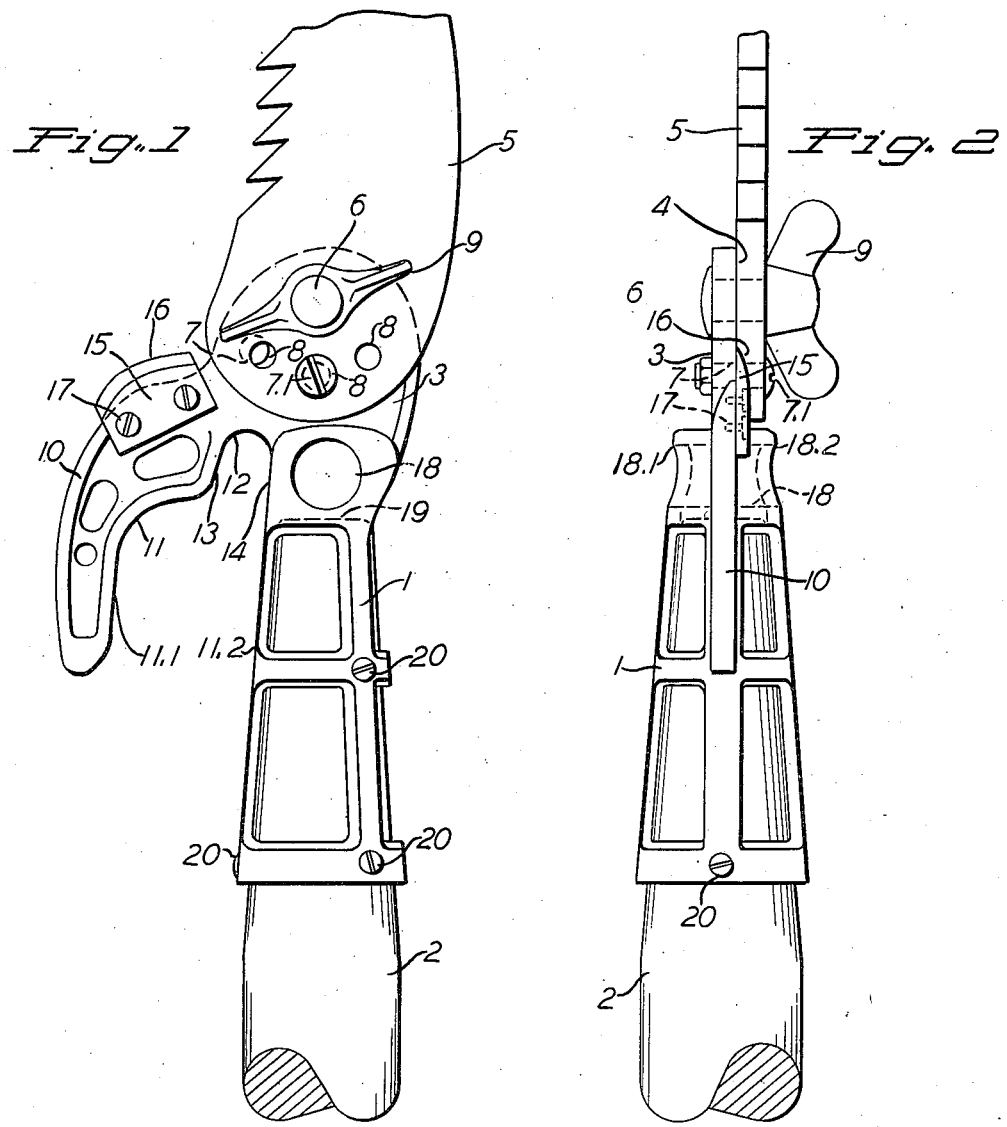

2,286,418

UNITED STATES PATENT OFFICE 2,286,418

POLE SAW HEAD

John A. Hoyt, Glenview, Ill., assignor of one-half to John F. Fonder, Evanston, Ill.

Application October 17, 1940, Serial No. 361,541

3 Claims. (Cl. 30—123)

This invention relates to pole saws such as are used for pruning trees and has particular reference to the head structure by means of which such saws are attached to the pole by which they are operated.

The main object of this invention is to provide an improved form of pole saw head having an improved form and arrangement of parts whereby a chisel or knife blade is supported in such relation to the saw blade as to greatly simplify the operation of severing branches from a tree and greatly minimize the risk of injury to the tree during such operations.

A further object is to improve the hook formation with which such pole saw heads are equipped and whereby the same may be used for shearing or breaking off twigs flush with the standing part of the tree as well as for hanging the tool from a branch in a safe manner.

A specific embodiment of this invention is shown in the accompanying drawing in which:

Figure 1 is a side elevation of a pole saw constructed according to this invention, the saw blade and pole being each partly broken away.

Fig. 2 is a side elevation of the same viewed from the left of Fig. 1.

In the form shown in the drawing, the pole saw head is of metal, preferably malleable cast iron, and comprises a tapered ferrule 1 shaped to receive the tapered end of a pole 2 and having at its upper end a cheek-plate 3 having a flat face 4 to which a saw blade 5 is secured by means of a bolt 6.

The cheek-plate 3 also has two or more apertures 7 arranged in the arc of a circle concentric with the bolt 6 for receiving a small bolt or threaded stud 7.1 which engages one of the adjustment apertures 8 of the saw blade. Apertures 8 are also arranged in an arc of a circle and are at the same distance from the center of the bolt 6 as are the apertures 7.

The apertures 7 are spaced apart however differently from the spacing of the apertures 8, thus providing a greater degree of adjustability of the angular disposition of the cutting edge of the saw with respect to the axis of the pole. The angle of the saw may be changed at will by removing the bolt 7.1 and tilting the saw head so as to bring either of the apertures 8 into registry with either of the apertures 7 and then inserting and securing the bolt in the registering apertures.

Extending outwardly from one side edge of the cheek-plate 3 is a hook 10. The concave side or bosom of the hook is of stepped contour to provide a large seat 11 by means of which the device may be suspended from a branch, and a small seat 12 which is of a depth sufficient to provide a secure grip from all angles on twigs that are to be broken off flush from the standing part of the tree by means of the tool.

Below the shoulder 11 which forms the larger of the two seats, the edge 11.1 of the hook 10 is substantially parallel with the longitudinal element of the opposed face 11.2 of the ferrule 1 and is of a length below the seat 11 substantially greater than the distance between the lines 11.1 and 11.2 so that the hook will remain safely engaged with a branch over which the tool may be hung.

Secured to the hook 10, adjacent its convex edge and close to the base or attached end of the saw blade is a chisel or knife blade 15. This preferably has a convexly curved cutting edge 16 and is held in place, by screws or rivets 17, against a side surface of the hook that is substantially flush with the saw seat on the cheek plate 3 (see Fig. 2).

The ferrule 1 is provided with a transverse aperture 18 which extends through its upper crown portion which is below and adjacent to the cheek-plate 3 and thus provides a socket of substantial length for receiving and securely supporting the handle of a paint brush in a stable position. The brush is not shown. But it will be understood that the handle of the brush for this purpose will be of rod-like form of a size that will freely enter the aperture 18 and that tilting of the brush in said aperture will be limited by the spaced margins 18.1 and 18.2 where the aperture 18 intersects the opposite surfaces of the ferrule of the saw supporting head. It will be understood that the tapered end of the pole is fitted to the ferrule so that its upper end 19 will not interfere with the insertion of the brush handle into the socket 18. As is usual, the tapered end of the pole has a driven fit with the ferrule and is additionally secured by means of a plurality of appropriately placed tacks or screws 20.

In operation the saw blade is manipulated by the pole 2 so as to cut a kerf in the upper side of the branch and when this kerf reaches a point sufficiently low to render the branch almost ready in the judgment of the operator to break off, the pole is given a quick forward thrust so as to cause the cutting edge 16 of the blade to sever the bark and some tissue on the near side of the branch and thus effect the break without any likelihood of the branch splitting off a strip of tissue from the standing part of the tree as it falls. After cutting off a branch, the operator may insert the handle of his paint brush into the socket 18 and paint the scarred tissue on the standing part of the tree without necessity for changing his position.

The hook is adapted to perform its usual function of facilitating the removal of several branches that may be resting on the boughs of the tree or suspending the device from a branch.

The small seat 12 with its slightly tapering sides 13 and 14 and substantial depth enables the hook to firmly engage twigs and branches for shearing or breaking them off flush with the standing part of the tree in a much more effective manner than this can be done by striking or pulling upon those twigs with the ordinary large hook.

Although but one specific embodiment of this invention is herein shown and described, it will be understood that details of the construction shown may be altered or omitted without departing from the spirit of the invention as defined by the following claims.

I claim:

1. A pole saw head comprising a pole ferrule having on its upper end a cheek-plate for securing a saw blade, a hook overhanging one side of the ferrule in the plane of the cheek-plate, said hook having its concave side stepped to form both large and small seats for engagement of branches, the large seat being substantially parallel sided and of greater depth than its width.

2. A pole saw head comprising a pole ferrule having on its upper end a cheek-plate having a seat for securing a saw blade in substantial alinement with the pole, a hook overhanging one side of the ferrule in the plane of said cheek-plate, and a knife blade seat on one side of said hook adjacent the seat for such saw blade.

3. A pole saw head comprising a pole ferrule having on its upper end a cheek-plate having a seat for securing a saw blade in substantial alinement with the pole, a hook overhanging one side of the ferrule in the plane of said cheek-plate and having a knife blade seat adjacent to its upper edge and adjacent to and in the plane of said saw blade seat, said hook having its concave lower edge stepped to form both large and small seats for hanging the device and for twisting off small branches, respectively.

JOHN A. HOYT.